May 5, 1959     A. BINKOWSKI     2,884,734
FLY BOBBER
Filed April 22, 1957
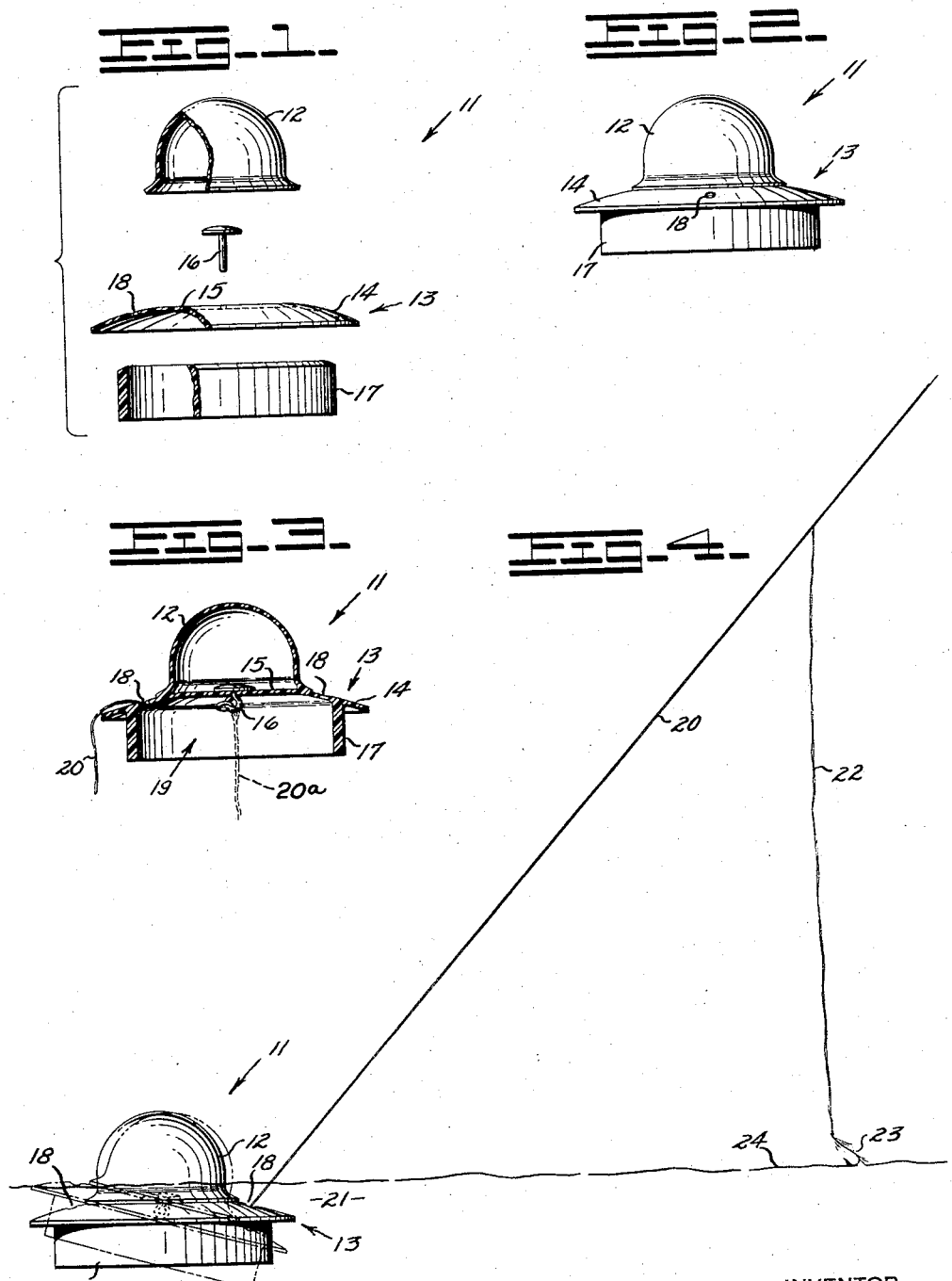
INVENTOR
ANDREW (NMI) BINKOWSKI
BY
ATTORNEY

2,884,734
FLY BOBBER

Andrew Binkowski, Lansing, Mich.

Application April 22, 1957, Serial No. 654,315

5 Claims. (Cl. 43—43.1)

The present invention relates to a fishing bobber structure and more particularly to a light weight buoyant anchor type bobber especially for use in fly fishing.

A wide variety of fishing bobbers are known in the art, but a common tendency of all such bobbers is that they do not resist movement by reason of line drag. Most fishermen are acquainted with the tendency of a bobber to move more or less rapidly in the direction of the fisherman. This problem is magnified when the bobber rigging is not directly in contact with the stream, lake or pond bottom. When any tension is put on the line connecting rod tip to bobber the inward "drift" of the bobber is accentuated. So far as is known no fishing bobber has heretofore been designed to resist these drift tendencies.

It has long been known to fly fishermen that one of the most tantalizingly effective uses of dry or wet lures depends upon the ability of the fisherman to simulate lifelike movement of the lures. For example, the dibbling of a dry fly into and out of contact with a water surface is by far the most effective use of a fly, but the accomplishment of such action is available only where the rod can be extended through foliage, for camouflage of fisherman and rod, and then the range of use is limited by the length of rod. Where "dibbling" is used, the fly is skipped or jiggled up and down off of the water surface in the manner of an insect touching the surface. Similarly, where "wet" lures (nymphs and subsurface flies) are employed the same bobbing or jiggling action is desirable employing the bottom of the lake, pond, or stream as a reference base. Such an effective use of fly lures has been distinctly limited since the limitations imposed upon the fisherman by previously known equipment have not provided means for the accomplishment of remote "dibbling" practices. It has therefore long been the desire of fly fishermen to find some means for reaching relatively inaccessible spots where the "dibbling" movement can be employed.

It is therefore among the objects of the present invention to provide a buoyant float structure which resists "drift" or movement caused by line drag.

It is still another object to provide a lightweight structure capable of being cast with lightweight fly fishing equipment.

It is still another object to provide a bobber structure which can be floated into position and which will provide sufficient resistance to line drag to permit the dibbling of a "drop fly" or lure located on the line or leader between the bobber structure and the rod tip.

Other objects including transparency of bobber, lightness in weight, simplicity in construction, and overall increase of drag resistance will be increasingly apparent to persons skilled in the fishing arts as the description proceeds.

In the drawing:

Figure 1 is an exploded side elevation view of the bobber of the present invention showing its various parts.

Figure 2 is a side elevation view of the bobber comprising the present invention in its assembled form and oriented 90 degrees from the structure as shown in Figure 1 to reveal one of the air release openings in the skirt portion.

Figure 3 is a full section view through a bobber in accord with the present invention showing an integral construction where float, skirt, and tubular keel are integrally connected with rigging attached in the preferred manner and with anchor type rigging shown in phantom line.

Figure 4 is a perspective view illustrating the normal riding position of the bobber in water with rigging and drop fly attached and showing the dipping action utilizing keel and skirt to resist line drag, the latter position shown in phantom line.

General description

In general, the structure comprising the present invention is extremely simple. A float or buoyant member is provided and a downwardly flaring peripheral skirt is attached thereto having openings therethrough proximate to the attachment of the skirt to the float portion. A tubular or rim-like keel extends downwardly from the skirt member. A rigging fastener is provided in the bottom portion of the float member extending into the space between keel and float portion.

When rigged for fly fishing, the bobber is attached to the end of a fly line or leader. A drop leader is positioned intermediate bobber and rod tip. The bobber is cast or floated into position and tends to resist line drag when tension is applied to the line. The shape of the bobber with its keel and skirt digs into the water to resist movement. In operation even a portion of the float is immersed and the skirt and keel is under water by reason of the holes in the skirt permitting substantial escape of entrapped air. As tension is applied to the line, the drop fly is raised from the water and "jiggled" at the surface by selected action of the rod tip.

Specific description

Referring more particularly to the drawing at Figure 1, a fishing bobber generally shown and designated by the numeral 11, the bobber 11 being exploded to reveal its construction. A buoyant member or float element 12 of generally hollow hemispheric construction comprises, when assembled, a bubble which lends buoyancy to the structure. A dished skirt-like element 13 is attached to the buoyant member 12. The skirt 13 is flanged peripherally from its contact with the buoyant member and the flange extends outwardly and downwardly. Viewed apart from the float element, the inverted dish-like member 13 generates, with its flange portion 14, a cone structure which is closed at its uppermost truncation 15. When assembled, the member 13 seals the float member 12. The closed truncation 15 of the skirt element 13 defines an opening at the axis of the cone for the insertion of a suitable fastener 16 such as the flange ended eye member. Sealing of the fastener 16 to the upper side of the closed truncation 15 effectively closes the member 12 so that no water can enter the member 12. A tubular keel 17 of slightly greater diameter than the buoyant member 12 and of lesser diameter than the flanged peripheral skirt 13 is provided to be attached in a coaxial position with respect to the axis of the members 12 and 13. The keel 17 is sealed to the skirt member 13 where the upper edge of the keel 17 contacts the flanged portion 14 of the skirt member 13. Thus, the keel 17 is a rim-like extension depending from the described structure. The flange 14 defines a plurality of openings 18 which communicate the open compartment 19 formed by the attachment of keel 17 to skirt member 13 to the outside atmosphere. The purpose of these openings 18 will be more readily appreciated as the description proceeds. Figure 3 best illustrates the cooperating inter-relationship of parts in the completed bobber 11. In Figure 3 it will be appreciated that integral bonding of parts has provided a unitary integrated construction. In Figure 2, the bobber 11 is shown oriented 90 degrees from the position of Figure 3 to clearly indicate the external appearance of the structure. In Figure 3 there is illustrated a manner of attaching fishing line or leader 20 to the fastener 16, the fastener 16 extending coaxially downward from the closed truncation 15, and the line 20 extending out through a selected opening 18 in the skirt member 13. An anchor line 20a or fishing line shown in phantom line may be dropped from the fastener 16 if desired.

In Figure 4 the bobber 11 is shown in water 21 with the line 20 extending therefrom toward a rod tip (not shown). A drop leader 22 extends downwardly from the line 20 and carries at its lowermost extremity a lure 23 illustrated in Figure 4 as a fly. As line tension is increased the keel 17 and skirt 13 dig into the water 21 to resist movement. As the line 20 draws taut, the lure 23 is jiggled into and out of contact with the water surface 24 simulating life-like surface action. If a subsurface lure is employed similar action is available in lower water strata. In Figure 4 the phantom-line presentation of the bobber 11 illustrates the keel-like resistance of the bobber to tension in the line 20. Figure 4 also clearly illustrates the substantial immersion of all but the buoyant float portion 12 so as to minimize water disturbance. It will be seen that the openings 18 have exhausted all air entrapped in the compartment 19 so that the bobber 11 rides desirably low in the water 21 so that the bobber 11 is effective as an anchor-like element while being inobtrusive on the surface.

The preferred embodiment of the bobber 11 as illustrated is formed from transparent plastic material so as to minimize shadow effect on the stream or lake bottom. The buoyancy of the structure is accomplished by air entrapped in the bubble 12. However, buoyancy may be otherwise achieved through use of material such as wood, cork, metal, and the like, or combinations of such materials. Similarly, opaque materials are satisfactory and the scope of the present invention regards such inclusions as embraced by the scope of the invention. Integrity of parts as possible in various plastic resin materials is shown best in Figure 3.

Operation

In operation the float or bobber structure as described is cast or floated to a position remote from the fisherman. As the distance from the fisherman increases, the tendency of the attached line to drag the bobber toward the fisherman is exerted. The fisherman can exaggerate this drag effect by raising his rod tip to apply tension to the line. When the drag or tension is applied to the bobber structure of the present invention, the bobber increases its effective keel resistance by tipping in the water so that the broad skirt digs into the water opposing the tendency to move the float or bobber.

This enhanced tendency to resist movement in water, which is the consequence of the described float or bobber construction, permits the fisherman to selectively increase and decrease tension on the fishing line or leader, thus variably elevating the attached line above the water surface depending upon the angle established by his rod tip position. Now, when a "drop fly leader" is attached to the line or leader intermediate the bobber and the rod tip, the associated lure can be "dibbled" or jiggled into and out of contact with the water surface, or in cases of "wet lures" the jiggling action is accomplished below the surface of the water with the reference point of movement being substantially invisible and above the water surface.

Such a rig, accomplished by use of the described bobber, materially extends the variety of approaches to fishing available to the angler. In many instances the fisherman can float his bobber into some hole quite inaccessible by means of ordinary casting and accomplish highly effective maneuvering of the lure at the selected fishing location.

As will be appreciated, the structure is of special significance to the fly fisherman, but the bank angler or still fisherman will readily appreciate the importance of obtaining a drift resisting structure of the character described.

Having thus described my structure, it will be appreciated that certain modifications may be made from time to time within the spirit of the hereinafter appended claims. It is the intention that such modifications be included in the scope of the present invention limited only by the scope of the hereinafter appended claims.

I claim:

1. In a bobber structure, the combination comprising: a float element; a skirt attached to said float element and peripherally flared downwardly around said float element and having an opening therethrough immediately adjacent the attachment of said skirt to said float element; and a rim-like keel connected to and extending downwardly from said skirt and coaxially located with respect to said float element and said skirt element.

2. In a bobber structure, the combination comprising: a float element; a skirt element peripherally attached to said float element and extending downwardly and outwardly therefrom and having a pressure equalizing opening therethrough; and a tubular keel connected to and extending downwardly from said skirt and being coaxially positioned with respect to said float element and said skirt element.

3. In a bobber structure, the combination including: a hollow float element; a skirt peripherally and integrally attached to said float element and flaring downwardly and outwardly having openings therethrough for pressure equalization; a keel member integrally attached to said skirt forming a rim-like downward extension of said skirt and coaxially positioned with respect to said float element and said skirt; and line retaining means attached to said bobber structure.

4. A bobber structure comprising: a substantially transparent hollow buoyant float member; a substantially transparent skirt peripherally joined to said float member and flaring outwardly and downwardly from said float and having air passages through the margin of said skirt adjacent said float to allow escape of entrapped air under said skirt; and a tubular keel joined to said skirt substantially midway between the upper and lower periphery of said skirt and coaxially positioned with respect to said float and said skirt; and line attaching means provided in the base portion of said float.

5. In a device for resisting the pull of a fishing line, the combination comprising: a transparent bubble-like float member; a transparent flared skirt member extending downwardly and outwardly from said float member and being integrally attached to said float member at its upper periphery and having pressure equalizing openings adjacent the attachment to said float member for releasing entrapped air; a transparent tubular keel integrally connected to said skirt substantially midway between the upper and lower periphery of said skirt and extending downwardly therefrom being coaxially positioned with respect to said float and said skirt; and line attaching means extending from the base of said float.

References Cited in the file of this patent

UNITED STATES PATENTS

| | | |
|---|---|---|
| 980,667 | Owen | Jan. 3, 1911 |
| 2,793,447 | King | May 28, 1957 |